Figure 1:
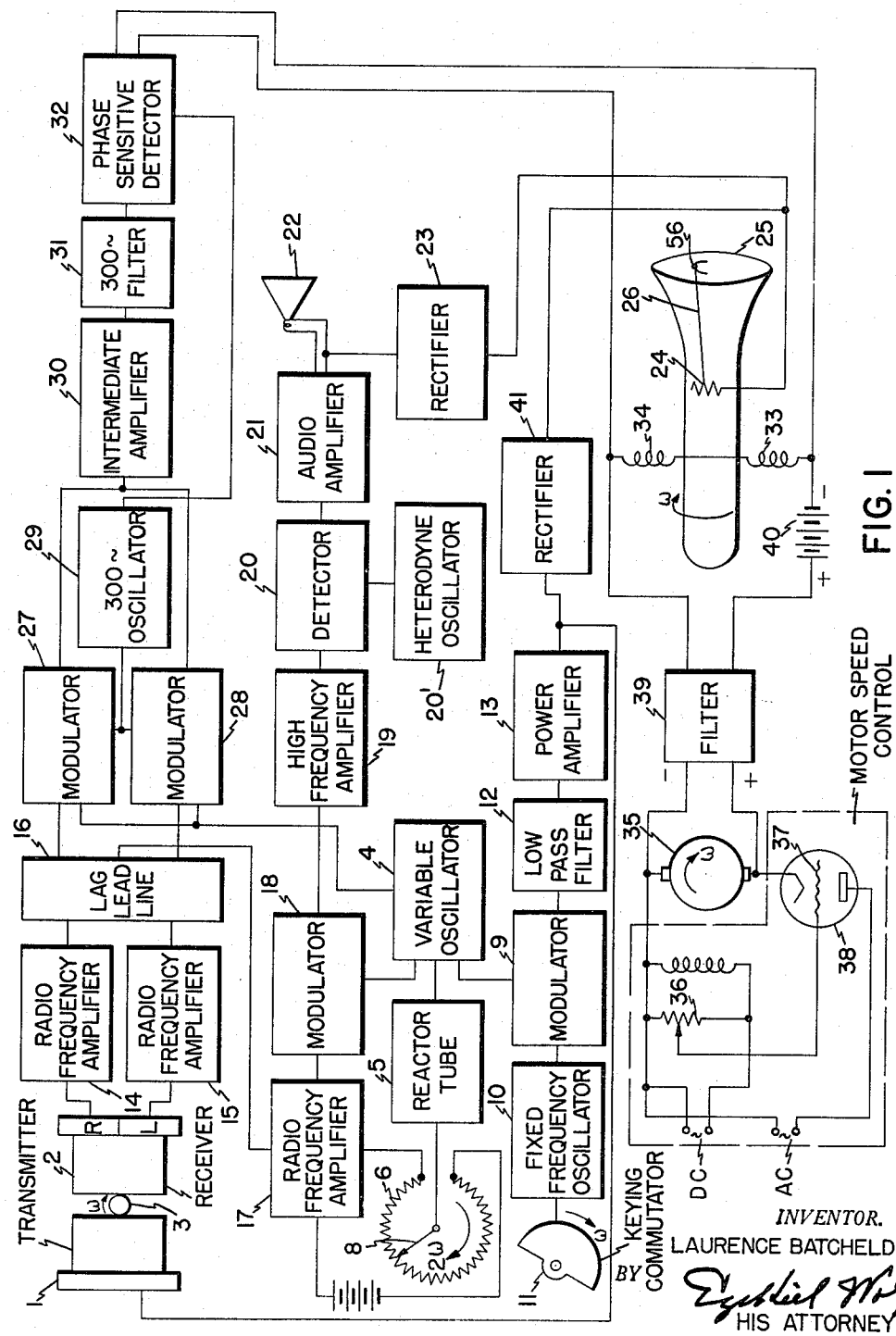

Nov. 29, 1960

L. BATCHELDER 2,962,694

RANGING SYSTEM

Filed Feb. 1, 1945

2 Sheets-Sheet 1

FIG. I

INVENTOR.
LAURENCE BATCHELDER
HIS ATTORNEY

Nov. 29, 1960

L. BATCHELDER 2,962,694

RANGING SYSTEM

Filed Feb. 1, 1945

2 Sheets-Sheet 2

INVENTOR.
LAURENCE BATCHELDER
BY
HIS ATTORNEY

United States Patent Office 2,962,694
Patented Nov. 29, 1960

2,962,694

RANGING SYSTEM

Laurence Batchelder, Cambridge, Mass., assignor, by mesne assignments, to Raytheon Company, a corporation of Delaware Filed Feb. 1, 1945, Ser. No. 575,692

13 Claims. (Cl. 340—3)

The present invention relates to a ranging system for the determination of distance and direction of an object being searched and more particularly to such a system operating in a water medium for the detection of surface vessels and submarines.

The present invention may be used for both commercial and military purposes for the prevention of collisions at sea, for guiding a vessel or, when used for military purposes, to detect the presence of a hostile surface vessel or submarine.

At the present time various systems and devices have been adopted, some tending towards automatic direction and distance measurement by sweeping a compressional wave beam about an arc and detecting the presence of a distant object by the receipt of an echo which is picked up by a rotatable receiver; the transmitter and receiver operating in established sequence so that if a signal or echo is received, the distance and direction will automatically be established. The present invention relates to this type of system but provides certain advantages over other systems, particularly in the method of indication of the echo and in the elimination of noises and reverberations from the system.

Due to the fact that the transmitter in the present system must transmit over a comparatively long period of time and thereafter the receiver must be sensitive to pick up the echoes, disturbances by way of reverberations and sounds will be impressed upon the receiver and make it difficult to pick up and amplify the echoes which of their nature are usually of lower intensity than the local reverberations. In order to overcome this in the present invention a frequency varying beam of compressional waves is swept over the arc which is being observed, the frequency at the end of the sweep being considerably different from that at the beginning of the sweep so that when the receiving projector is ready to pick up the echo, the last frequency which was sent is considerably different from the echo which is returning.

A further advantage in the present system is the use of a cathode ray tube in which the cathode ray beam is rotated corresponding in angular velocity to the rotation of the sound beam and in radius to the range of the object which is being observed. The system also includes a method by which the range may be corrected. This is effected by having the receiving echoes control the speed of rotation of the transmitting and receiving projectors. The receiving means establishes whether the receiving projector is leading or lagging in its rotation the range of the echo received and by this means a correction is applied to increase or decrease slightly the angular velocity of the rotating projector and receiver for establishing the correct range.

The present invention has a further advantage in this respect that such corrections are made without relying upon an accumulation of successive signals or echoes which are often confused and intermingled with extraneous reverberations and sound pulses picked up by the receiver.

Figure 2:
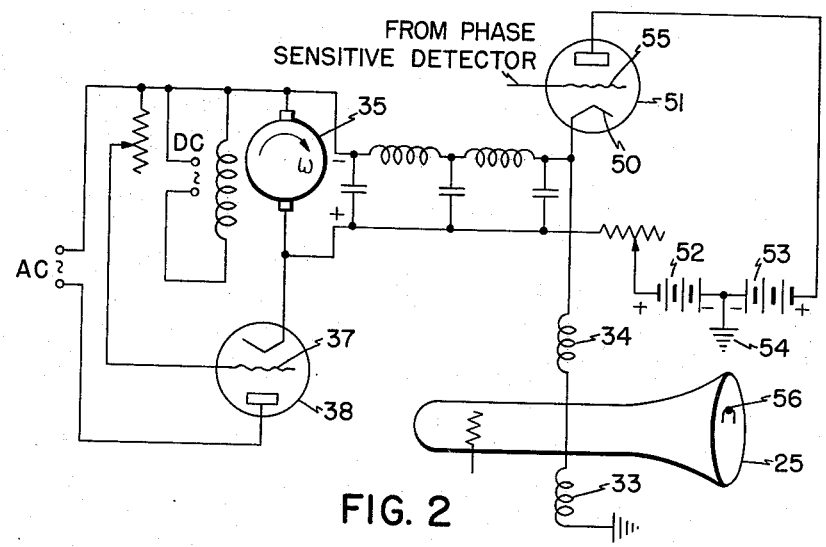
Figure 3:
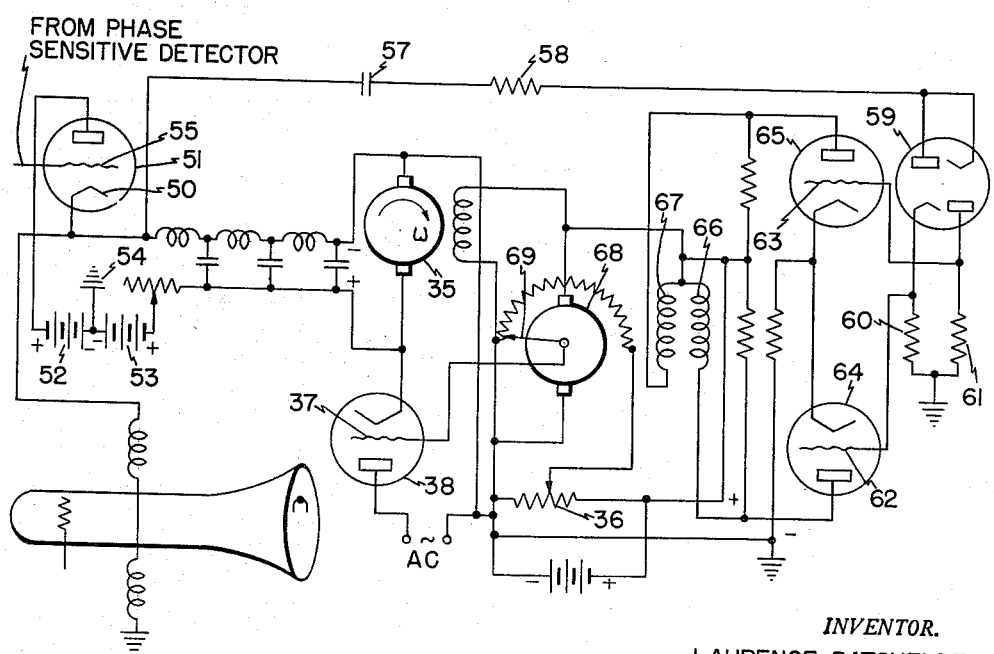

Other and further advantages of the present invention will be more readily understood from the description in the rest of the specification set forth below when taken in connection with the drawings illustrating an embodiment of the invention in which Fig. 1 shows an electrical diagram of the system with most elements indicated by legends; Fig. 2 shows a detail of a portion of the arrangement of Fig. 1; and Fig. 3 shows a detail illustrating the means of automatic range correction mentioned briefly above.

In Fig. 1, 1 represents the transmitting projector which may transmit a supersonic beam of sound energy by any of the usual well-known means such as magnetostriction, piezoelectric or electrodynamic elements. Such a projector together with a receiving projector 2 are mounted for rotation on a shaft 3 which is rotated at an angular velocity which is the same as the angular velocity of rotation of other elements in the system as will be explained later. The transmitting and receiving projector, while shown as mounted on the same shaft, may be rotated independently at the same velocities. In the present arrangement first the projector sweeps over a given sector of arc and then the receiver sweeps over the same sector of arc. As indicated in Fig. 1 for this purpose the projector and receiver may be arranged back to back with the projector transmitting for one-half revolution sweeping 180° and the receiver receiving for the second one-half of the revolution sweeping the same 180°. However if the projector and receiver are rotated independently, the projector may transmit every other revolution sweeping 360°, the receiver receiving for the alternate revolutions sweeping 360° while the transmitter is not operating. In the back to back arrangement shown in Fig. 1 if less than 180° is swept by the transmitter, there will be an interval between sending and reception. For instance, if the transmitter is swept through a forward arc of 120°, there will be a silent period for 60° before the receiver will act to range over the sector through which the beam was transmitted.

The transmitter 1 is supplied by the power amplifier 13 controlled through a varying frequency $f$ produced by the variable oscillator 4 the frequency of which is controlled by means of the reactor tube 5 and a potentiometer 6 over which the rotating arm 8 sweeps at an angular velocity of $2\omega$ which is twice the angular velocity at which the rotating projectors and receivers are rotated. By this arrangement a continuously upwardly or downwardly varying frequency will be transmitted, the whole sweep of the varying potential arm taking place while the transmitting projector is sweeping over the sector being observed. For this purpose the potentiometer 6 should be arranged substantially about a 360° circumference. The frequency developed by the variable oscillator may be established as a value $f+f_o$. This frequency is impressed upon the modulator 9 to which is also impressed a frequency $f_o$ of a fixed frequency oscillator 10 which is operated by the keying commutator 11 for sending the transmitted signal over the desired arc of sweep. For this purpose the keying commutator 11 is rotated at an angular velocity $\omega$ being the same as the velocity of rotation of the transmitting and receiving projectors. The modulator 9, which combines the frequencies $f+f_o$ and $f_o$, is connected through a low-pass filter 12 to a power amplifier 13 in which only the difference frequency $f$ is amplified because this is the frequency which is passed by the filter 12. The frequency $f$ is delivered to the transmitting projector and converted into a supersonic beam of compressional wave at the same frequency or a corresponding frequency. This frequency $f$ will vary continually during transmission either from a low to a high frequency or from a high to a low frequency.

The transmitter 1 may be operated, as mentioned above, for one half revolution preferably in the forward range of a vessel or for less than one half revolution. Thereafter it will be silent in accordance with the design of the keying commutator and will not again transmit until it faces in the desired direction. In the meantime, however, the receiving projector is faced in the proper direction and if an echo is returning from the chosen range, the receiving projector will pick the signal up on both portions of the projector marked R and L. The echo so picked up will correspond to a frequency in the varying range dependent upon the angular position at which the echo is received. The frequency picked up by the receiving projectors will be passed through the radio frequency amplifiers 14 and 15 and then through the lag lead line 16 to a second radio frequency amplifier 17 and then to the modulator 18 into which it will be impressed as a frequency $f$ corresponding to the frequency at which it was picked up. There is also impressed upon the modulator 18 the frequency of the variable oscillator 4 which is continually changing during the receiving cycle in accordance with the rotation of the arm 8 to provide the frequency for reception at the modulator 18 corresponding to that picked up by the receiver 2. In the output of the modulator, therefore, two frequencies are provided, one $fo$ and the other $2f+fo$. The high frequency amplifier 19 eliminates the frequency $2f+fo$ and presents to the detector 20 only the frequency $fo$. This frequency which is beat with the output of the heterodyne oscillator 20' is then impressed upon the audio amplifier 21 to amplify the beat note obtained and if desired upon a loud speaker 22.

A rectifier 23 is also connected to the output of the audio amplifier and this, in turn, is connected to the grid 24 of a cathode ray oscillograph tube 25 for providing a positive charge for brightening the beam 26 when the echo is produced. If the beam is suppressed at other instants, then the spot made visible by the brightening electrode 24 will indicate both the range and the direction of the echo and of the observed object or target. The beam of the cathode ray tube is deflected from its center by a biasing current applied to the coils 33 and 34 and is rotated by rotation of these coils at the angular velocity ω mentioned above by means of the motor 35. The speed of the motor and the current in the deflection coil are related to make the radius of the circle which the beam of the cathode ray tube makes a simple function of the speed of the motor and therefore of the range of the object being observed. The back E.M.F. of the motor 35 is proportional to its speed and is fed through the filter 39 to the deflection coils 33 and 34 in a polarity to oppose the E.M.F. of the battery 40. As the range of the target is decreased, the motor speed is increased and its back E.M.F. acts to reduce the current in the coils 33 and 34 thereby reducing the radius of the spot 56. The radius of the spot is then a measure of the range of the target and a suitably calibrated scale may be provided to indicate the range.

In the arrangement described it will be noted that the frequency delivered by the variable oscillator 4 to the modulator 18 will not correspond to that of the received signal unless the frequency $f$ delivered from the radio amplifier 17 and the frequency component $f$ of the variable oscillator are the same. Therefore, no signal will pass through the high frequency amplifier 19 tuned to $fo$ unless the instantaneous frequencies of the variable oscillator and the signal in the radio frequency amplifier 17 differ by $fo$.

In addition to controlling the brightness of the cathode ray beam through the received impulse provision is also made for retarding or increasing the angular velocity of the rotating system to bring the projector into directive alignment with the incoming signal so that the signal will be received on both halves of the receiving projector at the same time instant. Under ordinary conditions if the receiving projector is rotating too slowly for the range being observed, the signal will arrive at the receiving station as the foremost projector is approaching the direction from which the beam is being reflected. In such a case a pulse is transmitted which will tend to increase the velocity of rotation so that on the next revolution the echo will be received at the same time instant by both the forward and the rear projectors. "Forward" and "rear" in this case refer to the direction of rotation of the projectors which are directed substantially in the same direction and which by means of the lag lead line 16 have their axes of reception separated by a small angle.

The circuit arrangement for providing this means is also shown in Fig. 1. In this case the pulses from the different projectors or different projector halves, after passing over the lag-lead line 16, are transmitted to modulators 27 and 28, respectively, into which is impressed the frequency from the variable frequency oscillator 4 as well as a local low oscillator frequency 29 which may be of the order of 300 cycles. This low frequency oscillation is impressed upon the modulators 27 and 28 in opposite phase. The outputs of the modulators 27 and 28 pass through an intermediate frequency amplifier 30 which will amplify the fixed frequency $fo$ when the echo set for the desired range is received. The output of the intermediate amplifier 30 is passed through a band filter 31 for filtering the frequency corresponding to that delivered by the low frequency oscillator 29 with the result that the output of the filter 31 produces a pulse with a positive or negative phase dependent upon whether the output of the modulator 27 or 28 is predominant in intensity. The output from the filter 31 is impressed upon a phase-sensitive detector 32, the output of which, in turn, is superimposed upon a current flowing in the deflection coils 33 and 34 associated with the cathode ray tube 25. If the range is short, the action of the current in the deflection coil superimposed by the phase-sensitive detector 32 may be made such as to make an inward serration of the spot towards the center of the circle by decreasing momenarily the current in the coils. A longer range may be indicated by an increase of current in the coils 33 and 34 which would make an outward serration of the spot. This current in the deflection coils 33 and 34 is superimposed upon that produced by the control circuit which includes the driving motor 35, the speed of which may be controlled by the variable resistance adjustment 36 acting on the grid 37 of the gaseous conduction tube 38. By proper adjustment of the arm on the resistance 36 the speed of the motor may be controlled and set a desired value. The motor in this case will be a direct current motor with alternating current impressed through the armature and the gaseous conduction tube which acts as a rectifier during the positive half of the alternating current cycle. A filter 39 is provided which produces a substantially uniform direct current through the coils 33 and 34, the battery 40 being connected in series opposition to the voltage appearing across the output of the filter 39.

The arrangement in Fig. 1 just described will operate to produce an inward or outward serration of the beam together with a brightening of the beam indicating the receipt of the signal. The beam may be blanked out during transmission by connecting a rectifier 41 to the output of the power amplifier 13 and connecting the output of the rectifier to the control grid 24 to produce a negative potential thereon during transmission of the signal.

In the arrangement indicated in Fig. 2 the circuit is shown from the phase-sensitive detector on to the cathode ray tube. In this case the coils 33 and 34 of the cathode ray tube are directly connected to the cathode 50 of the thermionic tube 51, the anode-cathode circuit being returned through the motor 35, the direct current supply sources 52 and 53 connected in opposed relation to each other with a ground 54 between the two direct current supplies. The back E.M.F. generated by the motor 35 will produce a potential substantially proportional to the angular velocity of the motor 35 which will produce a corresponding current through the coils 33 and 34. This current will be augmented or decreased by the pulse discharged from the phase-sensitive detector controlling the grid 55 of the thermionic tube 51. This circuit arrangement in Fig. 2 may be employed in Fig. 1 for producing the desired serration of the indicator spot 56 in the rotation of the cathode ray beam.

In the arrangement of Fig. 3 the pulse control from the phase-sensitive detector on the grid 55 of the thermionic tube 51 is impressed through the condenser 57 and the impedance 58 upon a full-wave rectifier tube 59 tied to ground through resistances 60 and 61 which control respectively the grids 62 and 63 of a pair of thermionic tubes 64 and 65 respectively operating in a so-called push-pull relation. The outputs of the tubes 64 and 65 will produce direct current pulses either in the field windings 66 or the field windings 67 of the motor 68. These field windings are set up for reverse rotation so that if one is energized, the motor will operate in one direction while if the other is energized, the motor will operate in the reverse direction. The motor 68 controls a potentiometer arm 69 which may be driven through a reduction gear and which will be rotated a small amount by the direct current pulse in the coil 66 or 67 either in a clockwise or counter clockwise rotation. The potentiometer arm 69 controls the potential on the grid 37 of the tube 38 and this control may be made in series with the manually adjustable control 36 corresponding to that of Fig. 1. The pulse operation of the motor 68 will operate with each received signal if there is a differential of phase between that received on one receiving unit and that received on the other receiving unit. In such a case the arm 69 will be moved a small amount and remain in this position until successive signals may advance it one way or another. If a signal is missed or not received, then the motor 35 will still operate at the same speed as previously established until the arm 69 is manually reset. The motor 35 in Fig. 3 corresponds to that in Figs. 1 and 2, the only difference being that in Fig. 3 there is superimposed the additional control effected through the positioning of the potentiometer arm 69. An increased positive potential on the grid 37 will speed up the motor 35 while a decrease of positive potential will tend to decrease the motor speed. The motor 35, the speed of which is controlled both manually and automatically, establishes the angular velocity for the rotating system. The coils 33 and 34, the keying commutator 11 and the projector and receivers 1 and 2 are all rotated at the same speed either through Selsyn control or through shaft transmission. The potentiometer arm 8 may be controlled from any one of the driving units or from its own driving unit provided it is driven at twice the speed of the other units.

In the operation of the system a signal will be received if the speed of rotation of the receiver and projector is set for a range at which an object is positioned. For instance, if in search at sea a target is observed which is at a distance of 800 yards, it is well known that the time interval between transmission and reception will be about one second so that the receiver must pass the position for the direction of the target one second after the signal was transmitted. If this is then the observing range of the system, it will follow that two projectors sending and receiving placed back to back must make one revolution in two seconds in order for the receiver to be in position to receive the echo reflected from the distance of 800 yards.

By the arrangement of Fig. 3 if the echo is received from a position slightly less or greater than the set distance, then an automatic adjustment will be made to bring the echo in corrected range in successive observations unless, of course, the target is moving so rapidly that it may get out of range between successive signaling periods. The arrangement of Fig. 3 will further permit the target to be followed in or out of its course and therefore provide a continuous indication for the observer. The deflection of the cathode ray beam and its rotation may be controlled by electrostatic plates instead of the deflecting coils as shown. Instead of rotating the coils or plates to rotate the beam, the electrostatic or electromagnetic field may be rotated in a manner known in the art.

Having now described my invention, I claim:

1. A system for ranging comprising, in combination, means for producing a directive beam of compressional wave energy only during the time interval the beam is rotated through a desired sector of arc, means for rotating the compressional wave beam through said desired sector of arc at a given angular velocity, means simultaneously varying the frequency of the beam during its sweep of said arc continuously in increasing or decreasing value, means for directively receiving the compressional wave beam, means for rotating said receiving means through the desired sector at the said angular velocity after the compressional beam has been rotated through the said sector and selectively tuning the same for reception of reflection arriving from a given distance and a cathode ray tube indicating means having a cathode beam adapted to be rotated in synchronism with the receiving means at a radius corresponding to the given distance and means operative from said receiving means on said cathode beam to produce an indication thereof on the screen of the cathode ray tube.

2. A system for sounding ranging comprising, in combination, means for producing a directive beam of compressional wave energy only during the time interval the beam is rotated through a desired sector of arc, means for rotating said beam through said desired sector of arc at a given angular velocity, means for directively receiving the compressional wave beam, means for rotating said receiving means through the desired sector after the compressional beam has been rotated through the said sector at the same angular velocity as for the rotation of the said beam and a cathode ray tube indicating means having a cathode ray beam, means for rotating the cathode ray beam in synchronism with the receiving means, means maintaining said rotation of the cathode ray beam at a radius corresponding to a given distance being observed and means operative on said cathode beam to produce an indication of a reflection being received from the given distance.

3. A system for ranging comprising, in combination, means for producing a directive beam of compressional wave energy only during the time interval the beam is rotated through a desired sector of arc, means for rotating the compressional wave beam through said desired sector of arc at a given angular velocity, means simultaneously varying the frequency of the beam during its sweep of said arc continuously in increasing or decreasing values, means for directively receiving the compressional wave beam, means for rotating said receiving means through the desired sector at the said angular velocity after the compressional beam has been rotated through the said sector and for continually tuning the receiving means during its rotation of the arc from which a reflection is to return corresponding to the frequency which was emitted at the same point, a cathode ray tube indicating means having a cathode beam, means for rotating said cathode beam at a radius corresponding to a given distance being observed and means operative from said receiving means on said cathode ray beam to produce an indication on the screen of the cathode ray tube.

4. A system for ranging comprising, in combination, means for producing a directive beam of compressional wave energy only during the time interval the beam is rotated through a desired sector of arc, means for rotating the compressional wave beam through said desired sector of arc at a given angular velocity, means simultaneously varying the frequency of the beam during its sweep of said arc continuously in increasing or decreasing values, means for directively receiving the compressional wave beam, means for rotating said receiving means through the desired sector at the said angular velocity after the compressional beam has been rotated through the said sector and for continually tuning the receiving means during its rotation of the arc from which a reflection is to return corresponding to the frequency which was emitted at the same point, a cathode ray tube indicating means having a cathode beam, means for rotating said cathode beam at a radius corresponding to a given distance being observed and means operative from said receiving means on said cathode ray beam to produce an indication on the screen of the cathode ray tube, said last-named means including a control grid normally suppressing the beam on which a positive potential is impressed from said receiving means for making the beam momentarily visible.

5. In a system for sound ranging including means for rotating a beam of compressional waves in a desired sector being observed, a receiving projector system including two units positioned with respect to one another to receive from slightly different directions, means for rotating said projector at the same velocity at which the beam was rotated over the arc of said beam, and means operative by the signal received on said projector for indicating on which unit said reception was obtained including a cathode ray tube indicating means having a cathode beam with means for rotating the beam at a radius corresponding to a given range being observed and at the same angular velocity at which the receiving projector is rotated with means for producing a different radial serration of said beam depending upon whether the indication was received on one or the other units of said receiving projector.

6. In a system for sound ranging including means for rotating a beam of compressional waves in a desired sector being observed, a receiving projector system including two units positioned with respect to one another to receive from slightly different directions, means for rotating said projector at the same velocity at which the beam was rotated over the arc of said beam, and means operative by the signal received on said projector for indicating on which unit said reception was obtained including a cathode ray tube indicating means having a cathode beam with means for rotating the beam at a radius corresponding to a given range being observed and at the same angular velocity at which the receiving projector is rotated with means for producing a different radial serration of said beam depending upon whether the indication was received on one or the other units of said receiving projector, and means operative through said signal received by said receiving means for changing the speed of rotation of the system including that of the rotation of the compressional wave beam, of the receiving projector and of the cathode beam in accordance with the indication by said receiver of said serration indicating whether the range is too small or too great.

7. In a system for obstacle detection using a directive beam of wave energy, means for directly receiving the wave energy reflected from the object whose location and distance are to be determined, means for sweeping the receiving means periodically over an arc covering the area being observed and means controlled by the relation between the position of the receiving means and the arrival of the echo from the obstacle at the receiving means for effecting an increase or decrease in the rate of sweep of the receiving means to provide a synchronization of the coincidence of the arrival of the echo and the position of the receiving means.

8. In a system for obstacle detection, means for propagating a directive beam of wave energy, means for sweeping the beam over the arc of the area being observed, means for directively receiving wave energy reflected from the object whose direction and distance are to be determined, said means including units having directive right and left sense, means for sweeping the receiving means periodically over the same area being observed and means operatively controlled by the relation of the instantaneous position of the receiving means and the arrival of the reflected signal from the obstacle being observed at the receiving means for effecting an increase or decrease in the rate of sweep of the receiving means to provide synchronization of the coincidence of the arrival of the reflected signal and the position of the receiving means during successive periodic sweeps of both propagating and receiving means.

9. In a system for obstacle detection employing a directive propagating beam of wave energy swept periodically over an area being observed, means for directively receiving the wave energy reflected from the object whose direction and distance are to be determined, means for sweeping the receiving means periodically over the area being observed and means controlled by the relation between the position of the receiving means and the arrival of the echo from the obstacle at the receiving means for effecting an increase or decrease in the rate of sweep of the receiving means to provide a synchronization of the coincidence of the arrival of the echo and the position of the receiving means, said control means including a motor for rotating the receiving means and means controlling the speed of the motor including thermionic tubes and circuits operatively associated with the receiver for providing an increase or decrease in the motor speed dependent upon said relation between the position of the receiving means and the arrival of the echo.

10. In a system for obstacle detection using a directive beam of wave energy swept periodically over the area observed and a directive receiving means having a right and left sense for providing an indication whether the reflection is received to the right or left of the receiving means, a motor for rotating the receiving means and sweeping the same over the area being observed, means for controlling the angular velocity of sweep by said motor including variable means for regulating the voltage control of said motor, and means for developing an electric pulse in accordance with the right or left indication of the receiving means for operating said voltage-varying means to control the speed of said motor.

11. In a system for obstacle detection using a directive beam of wave energy swept periodically over the area observed and a directive receiving means including two units having directive axes oriented in directions forming an acute angle, a motor for rotating the receiving means and sweeping the same over the area being observed, means for controlling the angular velocity of sweep by said motor including means for varying the speed of the motor, said last-named means including a source providing an electric pulse acting upon the speed control means to increase or decrease the motor speed in accordance with the unit upon which the greater amount of wave energy was received.

12. In a system for obstacle detection using a directive beam of wave energy swept periodically over the area observed and a directive receiving means including two units having directive axes oriented in directions forming an acute angle, a motor having a field winding for rotating the receiving means and sweeping the same over the area being observed, means for controlling the angular velocity of sweep by said motor including potentiometer means and a second motor means for varying a tap of said potentiometer for controlling the current in the field winding of said first-named motor and means for impressing an electric pulse upon said second motor to effect a change of operating position thereof according to whether a greater amount of energy was received on one receiving unit than on the other.

13. In a system for obstacle detection using a directive beam of wave energy swept periodically over the area observed and a directive receiving means including two units having directive axes oriented in directions forming an acute angle, motor means having a field winding for rotating both the transmitting and receiving means at substantially the same velocity for picking up a reflection from an obstacle at a given distance range, means for controlling the angular velocity of sweep by the motor including potentiometer means for controlling the current supplied to the field winding of said motor and a second motor means for operating said potentiometer, said second motor means being operated in pulses by the received signal to advance or retract the potentiometer arm setting for varying the first-named motor speed with each pulse in accordance with the predominance of one signal over the other received by said receiving means.

References Cited in the file of this patent

UNITED STATES PATENTS

| | | |
|---|---|---|
| 1,973,673 | Rice | Sept. 11, 1934 |
| 2,011,392 | Bentley | Aug. 13, 1935 |
| 2,130,913 | Tolson | Sept. 20, 1938 |
| 2,231,929 | Lyman | Feb. 18, 1941 |
| 2,236,893 | Chaffee | Apr. 1, 1941 |
| 2,399,017 | Goldman | Apr. 23, 1946 |

FOREIGN PATENTS

| | | |
|---|---|---|
| 497,147 | Great Britain | Dec. 9, 1938 |
| 546,202 | Great Britain | July 2, 1942 |

UNITED STATES PATENT OFFICE
CERTIFICATION OF CORRECTION

Patent No. 2,962,694                  November 29, 1960

Laurence Batchelder

It is hereby certified that error appears in the above numbered patent requiring correction and that the said Letters Patent should read as corrected below.

Column 4, line 41, for "momenarily" read -- momentarily --; line 51, after "set" insert -- at --; column 7, line 64, for "directly" read -- directively --.

Signed and sealed this 30th day of May 1961.

(SEAL)
Attest:

ERNEST W. SWIDER                  DAVID L. LADD
Attesting Officer                  Commissioner of Patents